(12) United States Patent
Jung et al.

(10) Patent No.: US 8,050,853 B2
(45) Date of Patent: Nov. 1, 2011

(54) PROVIDING TRAFFIC INFORMATION INCLUDING SUB-LINKS OF LINKS

(75) Inventors: Mun Ho Jung, Gyeonggi-do (KR);
Moon Jeung Joe, Gyeonggi-do (KR);
Dong Hoon Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 1002 days.

(21) Appl. No.: 11/419,187

(22) Filed: May 18, 2006

(65) Prior Publication Data

US 2006/0262662 A1    Nov. 23, 2006

Related U.S. Application Data

(60) Provisional application No. 60/681,971, filed on May 18, 2005.

(51) Int. Cl.
*G06F 19/00* (2011.01)
*H04J 3/24* (2006.01)
*G01R 31/08* (2006.01)

(52) U.S. Cl. .................. 701/117; 370/349; 370/237

(58) Field of Classification Search .......... 701/117–119, 701/24, 301, 96, 200–226; 342/357.09, 104, 342/107, 70, 109, 46, 357.21, 357.2, 357.39; 340/988–996, 539.13, 539.2, 310.12, 310.16, 340/307, 902, 435, 466, 465, 425, 539.25; 180/170; 370/237, 349

See application file for complete search history.

(56) References Cited

U.S. PATENT DOCUMENTS

| | | | |
|---|---|---|---|
| 4,907,159 A | 3/1990 | Mauge | |
| 5,649,297 A | 7/1997 | Park | |
| 5,662,109 A * | 9/1997 | Hutson | ........................ 600/427 |
| 5,933,100 A | 8/1999 | Golding | |
| 6,067,499 A | 5/2000 | Yagyu et al. | |
| 6,067,502 A | 5/2000 | Hayashida et al. | |
| 6,075,467 A | 6/2000 | Ninagawa | |
| 6,085,137 A | 7/2000 | Aruga et al. | |
| 6,101,443 A | 8/2000 | Kato et al. | |
| 6,115,667 A | 9/2000 | Nakamura | |
| 6,125,323 A | 9/2000 | Nimura et al. | |
| 6,128,571 A | 10/2000 | Ito et al. | |

(Continued)

FOREIGN PATENT DOCUMENTS

DE       19733179 A1     2/1998

(Continued)

OTHER PUBLICATIONS

U.S. Office Action dated Jul. 22, 2009 for U.S. Appl. No. 11/419,127, 18 pages.

(Continued)

*Primary Examiner* — James Trammell
*Assistant Examiner* — Muhammad Shafi
(74) *Attorney, Agent, or Firm* — Fish & Richardson P.C.

(57) ABSTRACT

A method for identifying traffic information for at least one sub-link includes receiving traffic information including a sub-link identifier enabling a determination of whether the received traffic information includes sub-link information, traffic status information enabling a determination of traffic information for a sub-link, information identifying a link within which the sub-link is located, and sub-link location information enabling a determination of a portion of the link that corresponds to the sub-link. The method also includes determining, based on the sub-link identifier whether the received traffic information includes sub-link information and dependent on whether the sub-link identifier enables a determination that the received traffic information includes sub-link information.

5 Claims, 7 Drawing Sheets

U.S. PATENT DOCUMENTS

| | | |
|---|---|---|
| 6,232,917 B1 | 5/2001 | Baumer |
| 6,236,933 B1 | 5/2001 | Lang |
| 6,324,466 B1 | 11/2001 | Vieweg |
| 6,401,027 B1 | 6/2002 | Xu |
| 6,434,477 B1 | 8/2002 | Goss |
| 6,438,490 B2 | 8/2002 | Ohta |
| 6,438,561 B1 | 8/2002 | Israni |
| 6,453,230 B1 | 9/2002 | Geurts |
| 6,477,459 B1 | 11/2002 | Wunderlich |
| 6,594,576 B2 | 7/2003 | Fan |
| 6,597,982 B1 | 7/2003 | Schmidt |
| 6,610,321 B2 | 8/2003 | Huang et al. |
| 6,611,749 B1 | 8/2003 | Berwanger |
| 6,615,133 B2 | 9/2003 | Boies |
| 6,618,667 B1 | 9/2003 | Berwanger |
| 6,633,808 B1 | 10/2003 | Schulz et al. |
| 6,687,611 B1 | 2/2004 | Hessing et al. |
| 6,741,932 B1 | 5/2004 | Groth |
| 6,810,321 B1 | 10/2004 | Cook |
| 6,873,904 B2 | 3/2005 | Yamamoto et al. |
| 6,904,362 B2 | 6/2005 | Nakashima et al. |
| 6,924,751 B2 | 8/2005 | Hempel et al. |
| 6,970,132 B2 | 11/2005 | Spilker, Jr. |
| 6,990,407 B1 | 1/2006 | Mbekeani et al. |
| 6,995,769 B2 | 2/2006 | Ordentlich et al. |
| 6,996,089 B1 | 2/2006 | Ruf |
| 7,013,983 B2 | 3/2006 | Matsumoto et al. |
| 7,047,247 B1 | 5/2006 | Petzold et al. |
| 7,106,219 B2 | 9/2006 | Pearce |
| 7,139,467 B2 | 11/2006 | Seo et al. |
| 7,139,659 B2 | 11/2006 | Mbekeani et al. |
| 7,188,025 B2 | 3/2007 | Hudson |
| 7,251,558 B1 | 7/2007 | McGrath |
| 7,269,503 B2 | 9/2007 | McGrath |
| 7,319,931 B2 | 1/2008 | Uyeki et al. |
| 7,355,528 B2 * | 4/2008 | Yamane et al. .......... 340/995.13 |
| 7,373,247 B2 | 5/2008 | Park |
| 7,375,649 B2 | 5/2008 | Gueziec |
| 7,403,852 B2 | 7/2008 | Mikuriya et al. |
| 7,609,176 B2 * | 10/2009 | Yamane et al. ................ 340/994 |
| 7,650,227 B2 | 1/2010 | Kirk et al. |
| 7,657,372 B2 | 2/2010 | Adachi et al. |
| 7,701,850 B2 | 4/2010 | Kim et al. |
| 7,729,335 B2 | 6/2010 | Lee et al. |
| 7,739,037 B2 | 6/2010 | Sumizawa et al. |
| 7,877,203 B2 | 1/2011 | Mikuriya et al. |
| 2001/0028314 A1 | 10/2001 | Hessing et al. |
| 2003/0036824 A1 | 2/2003 | Kuroda et al. |
| 2003/0083813 A1 | 5/2003 | Park |
| 2003/0102986 A1 | 6/2003 | Hempel et al. |
| 2003/0179110 A1 | 9/2003 | Kato |
| 2004/0148092 A1 * | 7/2004 | Kim et al. .................... 701/200 |
| 2004/0198339 A1 | 10/2004 | Martin |
| 2004/0246888 A1 | 12/2004 | Peron |
| 2004/0249560 A1 | 12/2004 | Kim et al. |
| 2005/0027437 A1 | 2/2005 | Takenaga et al. |
| 2005/0038596 A1 | 2/2005 | Yang et al. |
| 2005/0081240 A1 | 4/2005 | Kim |
| 2005/0107944 A1 | 5/2005 | Hovestadt et al. |
| 2005/0141428 A1 | 6/2005 | Ishikawa |
| 2005/0143906 A1 | 6/2005 | Ishikawa et al. |
| 2005/0198133 A1 * | 9/2005 | Karaki ........................... 709/204 |
| 2005/0206534 A1 | 9/2005 | Yamane |
| 2005/0209772 A1 | 9/2005 | Yoshikawa |
| 2005/0231393 A1 | 10/2005 | Berger et al. |
| 2006/0139234 A1 | 6/2006 | Tanaka |
| 2006/0143009 A1 | 6/2006 | Jost et al. |
| 2006/0173841 A1 | 8/2006 | Bill |
| 2006/0178105 A1 | 8/2006 | Kim |
| 2006/0178807 A1 | 8/2006 | Kato et al. |
| 2006/0265118 A1 | 11/2006 | Lee et al. |
| 2006/0268721 A1 | 11/2006 | Lee |
| 2006/0268736 A1 | 11/2006 | Lee et al. |
| 2006/0268737 A1 | 11/2006 | Lee et al. |
| 2006/0271273 A1 | 11/2006 | Lee et al. |
| 2006/0281444 A1 | 12/2006 | Jung |
| 2007/0005795 A1 | 1/2007 | Gonzalez |
| 2007/0019562 A1 | 1/2007 | Kim et al. |
| 2007/0122116 A1 | 5/2007 | Seo et al. |
| 2007/0167172 A1 | 7/2007 | Kim et al. |
| 2009/0125219 A1 | 5/2009 | Lee et al. |

FOREIGN PATENT DOCUMENTS

| | | |
|---|---|---|
| DE | 197 33 179 | 5/1998 |
| DE | 100 60 599 | 6/2002 |
| DE | 101 01 349 | 8/2002 |
| EP | 0 725 500 | 8/1996 |
| EP | 1 006 684 | 6/2000 |
| EP | 1 030 475 | 8/2000 |
| EP | 1 041 755 | 10/2000 |
| EP | 1 079 353 | 2/2001 |
| EP | 725500 B1 | 4/2003 |
| EP | 1 376 512 | 1/2004 |
| EP | 1 445 750 | 8/2004 |
| EP | 1 460 599 | 9/2004 |
| EP | 1150265 B1 | 10/2006 |
| EP | 1 049 277 B1 | 2/2007 |
| GB | 2 342 260 | 4/2000 |
| JP | 09-062884 | 3/1997 |
| JP | 11-160081 | 6/1999 |
| JP | 2001-082967 | 3/2001 |
| JP | 2001-272246 | 10/2001 |
| JP | 2004-164373 | 6/2004 |
| JP | 2004-186741 | 7/2004 |
| JP | 2004-295736 | 10/2004 |
| JP | 2004-355662 | 12/2004 |
| JP | 2005-056061 | 3/2005 |
| KR | 10-1999-0025959 | 4/1999 |
| KR | 10-2001-0016252 | 3/2001 |
| KR | 10-2002-0017535 | 3/2002 |
| KR | 10-2003-0034915 | 5/2003 |
| KR | 10-2003-0037455 | 5/2003 |
| KR | 10-2004-0033141 | 4/2004 |
| KR | 10-2004-0084374 | 10/2004 |
| KR | 10-2004-0084508 | 10/2004 |
| KR | 10-2005-0037776 | 4/2005 |
| KR | 10-2005-0062320 | 6/2005 |
| KR | 10-2006-0002468 | 1/2006 |
| KR | 10-2006-0063563 | 6/2006 |
| KR | 10-2006-0063629 | 6/2006 |
| KR | 10-2006-0076574 | 7/2006 |
| WO | WO 98/24079 | 6/1998 |
| WO | WO 98/26395 | 6/1998 |
| WO | WO 98/26396 | 6/1998 |
| WO | WO 98/41959 | 9/1998 |
| WO | WO9841959 A1 | 9/1998 |
| WO | WO 00/30058 | 5/2000 |
| WO | WO 00/36771 | 6/2000 |
| WO | WO 00/39774 | 7/2000 |
| WO | WO 01/06478 | 1/2001 |
| WO | WO 01/18767 | 3/2001 |
| WO | WO 01/18768 | 3/2001 |
| WO | WO0118767 A1 | 3/2001 |
| WO | WO0118768 A1 | 3/2001 |
| WO | WO 01/31497 | 5/2001 |
| WO | WO 02/01532 | 1/2002 |
| WO | WO 02/13161 | 2/2002 |
| WO | WO 02/082402 | 10/2002 |
| WO | WO2004/036545 * | 4/2004 |
| WO | WO 2005/020576 | 3/2005 |

OTHER PUBLICATIONS

European Search Report dated Jul. 30, 2008 for Application No. 06747437.9, 9 pages.
International Search Report dated Apr. 25, 2007 for Application No. PCT/KR2007/000324, 7 pages.
International Search Report dated May 8, 2007 for Application No. PCT/KR2007/000318, 7 pages.
International Search Report dated Aug. 28, 2006 for Application No. PCT/KR2006/001836, 1 page.
International Search Report dated Sep. 6, 2006 for Application No. PCT/KR2006/001843, 9 pages.
Office Action dated Feb. 24, 2009 for U.S. Appl. No. 11/419,127, 37 pages.
Office Action dated Apr. 3, 2009 for U.S. Appl. No. 11/419,164, 44 pages.

Korean Office Action dated Nov. 15, 2006 for Application No. KR 10-2005-0086890, 3 pages.
European Search Report dated Aug. 11, 2008 for Application No. 06747441.1, 8 pages.
International Search Report dated Aug. 28, 2006 for Application No. PCT/KR2006/001860, 1 page.
International Search Report dated Sep. 6, 2006 for Application No. PCT/KR2006/001834, 1 page.
International Search Report dated Oct. 19, 2006 for Application No. PCT/KR2006/001835, 2 pages.
International Search Report dated Sep. 27, 2006 for Application No. PCT/KR2006/001837, 2 pages.
International Search Report dated Aug. 28, 2006 for Application No. PCT/KR2006/001859, 1 page.
International Search Report dated Oct. 19, 2006 for Application No. PCT/KR2006/002068, 1 page.
European Search Report dated Sep. 30, 2008 for Application No. 06747474.2, 8 pages.
European Search Report dated Sep. 25, 2008 for Application No. 06747435.3, 8 pages.
European Search Report dated Jun. 30, 2008 for Application No. 06747440.3, 10 pages.
European Search Report dated Oct. 15, 2008 for Application No. 06747434.6, 8 pages.
European Search Report dated Aug. 14, 2008 and Jul. 28, 2008 for Application No. 06747433.8, 11 pages.
Office Action dated Dec. 1, 2008 for U.S. Appl. No. 11/424,111, 23 pages.
Office Action dated Jan. 2, 2009 for U.S. Appl. No. 11/419,095. 32 pages.
European Search Report dated Nov. 4, 2009 issued in European Application No. 09171279.4-2215, 7 pages.
European Search Report dated Oct. 23, 2009 for Application No. 09170601.0-2215.
European Search Report dated Oct. 26, 2009 for Application No. 09170878.4-2215.
Notice of Allowance issued in U.S. Appl. No. 11/419,095 dated Dec. 3, 2009.
Office Action issued in U.S. Appl. No. 11/419,127 dated Dec. 14, 2009.
Tristan Ferne, BBC Research & Development, TPEG C++ Libraray Documentation (v2.0), dated Mar. 20, 2002, 10 pages.
U.S. Office Action for U.S. Appl. No. 11/424,111, dated Aug. 11, 2009, 14 pages.
Office Action issued in U.S. Appl. No. 11/419,164 dated Oct. 1, 2009, 30 pages.
Office Action issued in U.S. Appl. No. 11/419,178 dated Sep. 3, 2009, 10 pages.
European Search Report dated Nov. 17, 2008 for Application No. 06747441.1, 7 pages.
European Search Report dated Sep. 4, 2009 for Application No. 09165793.2-2215, 9 pages.
Office Action issued in U.S. Appl. No. 11/419,095 dated Jul. 31, 2009, 30 pages.
U.S. Office Action dated Jul. 31, 2009 for U.S. Appl. No. 11/419,095, 30 pages.
U.S. Non-Final Office Action dated Feb. 3, 2011 for U.S. Appl. No. 11/419,178, 12 pages.
"TPEG TEC Application Specification," Working Document, Development Project, Mobile Info, Mar. 9, 2006, 30 pages.
"Traffic and Travel Information (TTI)—TTI via Transport Protocol Experts Group (TPEG) Extensible Markup Language (XML_—Part 1: Introduction, common data types and tpegML," Technical Specification, ISO/TS 24530-1, First Edition, Apr. 15, 2006, 20 pages.
Bev Marks, "TPEG—Standardized at Last," Oct. 2005.
European Office Action and Search Report issued in Application No. 09159699.9-2215 dated Jun. 26, 2009.
European Search Report dated Jun. 20, 2008 for Application No. 06747461.9, 8 pages.
International Search Report dated Sep. 6, 2006 for Application No. PCT/KR2006/2002012, 2 pages.
Office Action issued in U.S. Appl. No. 11/424,111 dated Feb. 3, 2010, 21 pages.
Office Action issued in U.S. Appl. No. 11/419,164 dated Mar. 11, 2010, 32 pages.
U.S. Notice of Allowance and Fee(s) Due for U.S. Appl. No. 11/419,127 dated Dec. 13, 2010, 17 pages.
Office Action issued in U.S. Appl. No. 11/419,127 on Jun. 7, 2010, 24 pages.
Office Action issued in U.S. Appl. No. 11/914,682 on Jul. 1, 2010, 11 pages.
Notice of Allowance issued in U.S. Appl. No. 11/419,164 on Jul. 21, 2010, 15 pages.
Notice of Allowance issued in U.S. Appl. No. 11/419,095 on Aug. 9, 2010, 17 pages.
Notice of Allowance issued in U.S. Appl. No. 11/419,127 on Aug. 23, 2010, 17 pages.
Notice of Allowance issued in U.S. Appl. No. 11/419,164 on Sep. 8, 2010, 11 pages.
U.S. Notice of Allowance dated Apr. 8, 2011 for U.S. Appl. No. 11/624,424, 9 pages.
U.S. Office Action dated May 6, 2011 for U.S. Appl. No. 11/424,111, 20 pages.

* cited by examiner

```
<link_info_component(01)>:=: Link information component
  <intunti>(id),         : identifier, id = 01 hex
  <intunli>(n),          : data length in byte (n)
  m*<link_info_sub_component()>;: link information sub component
```

A (sub-link divided from a link)

FIG.5 c

A (sub-link divided from a link)

PROVIDING TRAFFIC INFORMATION INCLUDING SUB-LINKS OF LINKS

CROSS-REFERENCE TO RELATED APPLICATIONS

The present application claims priority from U.S. provisional application No. 60/681,971 filed May 18, 2005, which is titled "Traffic information signal and method and apparatus for providing the signal," and Korean application No. 10-2005-0099532, filed Oct. 26, 2005, the entire contents of which are incorporated herein by reference.

BACKGROUND

1. Field

The present document relates to providing traffic information including sub-links of link and using the provided traffic information.

2. Description of the Related Art

With the advancement in digital signal processing and communication technologies, radio and TV broadcasts are being digitalized. Digital broadcasting enables provision of various information (e.g., news, stock prices, weather, traffic information, etc.) as well as audio and video content.

SUMMARY

In one general aspect, a method for identifying traffic information for at least one sub-link is provided. The method includes receiving traffic information including a sub-link identifier enabling a determination of whether the received traffic information includes sub-link information, traffic status information enabling a determination of traffic information for a sub-link, information identifying a link within which the sub-link is located, and sub-link location information enabling a determination of a portion of the link that corresponds to the sub-link. The method also includes determining, based on the sub-link identifier whether the received traffic information includes sub-link information and dependent on whether the sub-link identifier enables a determination that the received traffic information includes sub-link information.

Implementations may include one or more additional features. For instance, the method may include receiving a data length associated with the traffic information, a text name or description of the sub-link, and a start and end location of the sub-link. Receiving sub-link location information may include receiving vertex, coordinate, or longitude and latitude information that corresponds to a location associated with the sub-link. Receiving sub-link location information may include receiving vertex, coordinate, or longitude and latitude information that corresponds to the link.

Also, in the method, after the sub-link is determined to be within the link, additional sub-link information to enable deletion of the sub-link may be received. The sub-link may, only if the received additional sub-link information includes an identifier that enables a determination that the sub-link is to be deleted, be deleted. The received additional sub-link information may specify the sub-link identifier and the identifier of the link.

The method may further include receiving additional sub-link information after the sub-link is determined to be within the link, and using the received additional sub-link information to alter the position of the determined sub-link within the link. The received additional sub-link information may include at least one of a start location and an end location of the determined sub-link. The received additional sub-link information may be used to extend or shorten a length of the sub-link. Additional sub-link information may be received after the sub-link is determined to be within the link, and the received additional sub-link information may be used to alter the position of the determined sub-link beyond location constraints associated with the link.

Also, the method may further include receiving information corresponding to a message management structure including information corresponding to a generation time of the information included in the message management structure. The generation time included within the received message management structure may relate to the status information for the sub-link. The generation time included within the received message management structure may relate to a plurality of message component structures that correspond to more than one of a predicted or current traffic tendency, a predicted or current amount of traffic, a predicted or current speed, and a predicted or current time to traverse a particular link. Receiving information reflecting a message component structure may include receiving information associated with identification and configuration of the sub-link.

Further, in the method, the traffic status information for the sub-link may include information associated with at least one of a predicted or current travel speed on the sub-link, a predicted or current congestion level or amount on the sub-link, a predicted or current travel time to traverse the sub-link, or a predicted or current speed of travel on the sub-link, may be received. The traffic status information for the sub-link may differ from traffic status information for the link. The traffic status information for the sub-link may be received after receiving traffic status information that is configured to reveal status for the link, the sub-link status information being configured to enable updated status information for a portion of the link corresponding to the sub-link. Receiving sub-link information may include receiving a text descriptor associated with the sub-link.

In another general aspect, a traffic information communication device is provided. The device includes a data receiving interface configured to receive traffic information including a sub-link identifier enabling a determination of whether the received traffic information includes sub-link information and traffic status information enabling a determination of traffic information for a sub-link. The device is also configured to receive information identifying a link within which the sub-link is located, and sub-link location information enabling a determination of a portion of the link that corresponds to the sub-link. The device also includes a processing device configured to process the traffic information received from the data receiving interface and to determine sub-link status information based at least in part on the traffic information received.

Implementations may include one or more additional features. For instance, the data receiving interface may receive additional sub-link information after the sub-link is determined to be within the link, and the processing device may be configured to use the received additional sub-link information to alter the position of the determined sub-link within the link. The received additional sub-link information may include at least one of a start location and an end location of the determined sub-link. The processing device may be configured to use the received additional sub-link information to extend or shorten a length of the sub-link. The data receiving interface may receive additional sub-link information after the sub-link is determined to be within the link, and the processing device may be configured to use the received additional sub-link information to alter the position of the determined sub-link beyond location constraints associated with the link.

In a further general aspect, an apparatus for identifying traffic information for at least one sub-link is provided. The apparatus includes means for receiving traffic information including a sub-link identifier enabling a determination of whether the received traffic information includes sub-link information, traffic status information enabling a determination of traffic information for a sub-link, information identifying a link within which the sub-link is located, and sub-link location information enabling a determination of a portion of the link that corresponds to the sub-link. The method also includes means for determining, based on the sub-link identifier whether the received traffic information includes sub-link information and means for, dependent on whether the sub-link identifier enables a determination that the received traffic information includes sub-link information.

Implementations may include one or more additional features. For instance, the means for receiving may include means for receiving additional sub-link information after the sub-link is determined to be within the link, the apparatus further comprising means for using the received additional sub-link information to alter the position of the determined sub-link within the link.

The method may also include means for using the received additional sub-link information to extend or shorten a length of the sub-link. The means for receiving may include means for receiving additional sub-link information after the sub-link is determined to be within the link, the apparatus may further include means for using the received additional sub-link information to alter the position of the determined sub-link beyond location constraints associated with the link.

The details of one or more implementations are set forth in the accompanying drawings and the description below. Other features will be apparent from the description and drawings, and from the claims.

BRIEF DESCRIPTION OF THE DRAWINGS

The accompanying drawings illustrate various implementations. In the drawings.

DETAILED DESCRIPTION

One such use for digital broadcasts is to satisfy an existing demand for traffic information. Proposals that involve the use of digital broadcasts for this purpose contemplate the use of standardized formatting of traffic information to be broadcast. This approach may be used to enable the use of traffic information receiving terminals made by different manufacturers, which each could be configured to detect and interpret traffic information broadcast in the same way.

Figure 1:
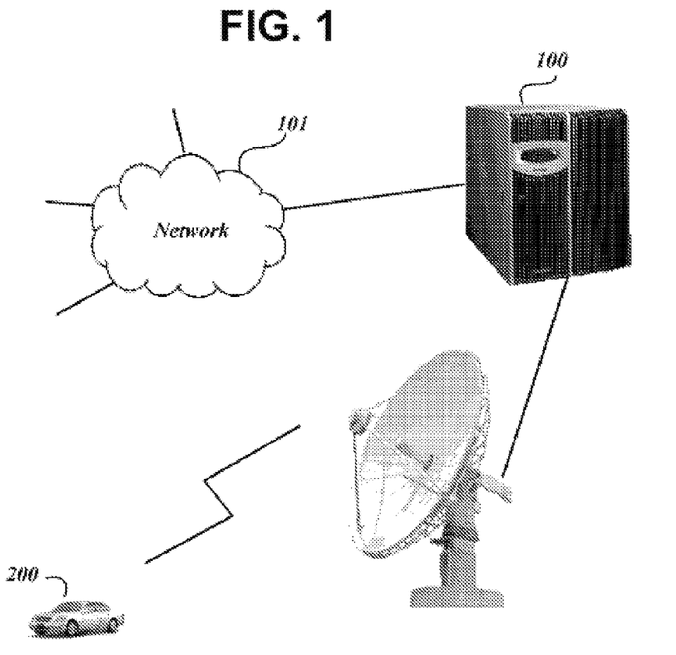
FIG. 1 illustrates a schematic diagram of a network through which traffic information is provided.

FIG. 1 is a schematic diagram of a network through which traffic information is provided. A traffic information providing server 100 in a broadcast station may transmit traffic information, e.g., traffic congestion information collected from various sources (e.g., operator input, or information received from another server or probe cars through a network 101) wirelessly so that a traffic information receiving terminal (e.g., navigation system installed in a car 200) may receive the traffic information. In the below explanation about implementations, the traffic information means traffic congestion information.

Figure 2A:
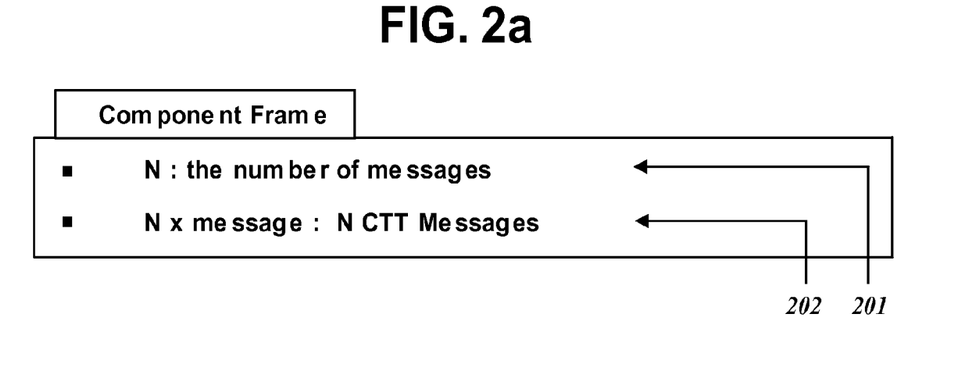
FIG. 2a illustrates a partial syntax of a component frame including traffic information.

The traffic information wirelessly transmitted from the traffic information providing server 100 may be of the form of a component frame. As shown in FIG. 2a, a component frame may include a field 201 indicative of the number of messages included therein and a sequence of transport protocol expert group messages 202, where the number of the messages being equal to the value stored in the field 201. The transport protocol expert group message will be referred to as the TPEG-CTT message hereinafter.

Figure 2B:
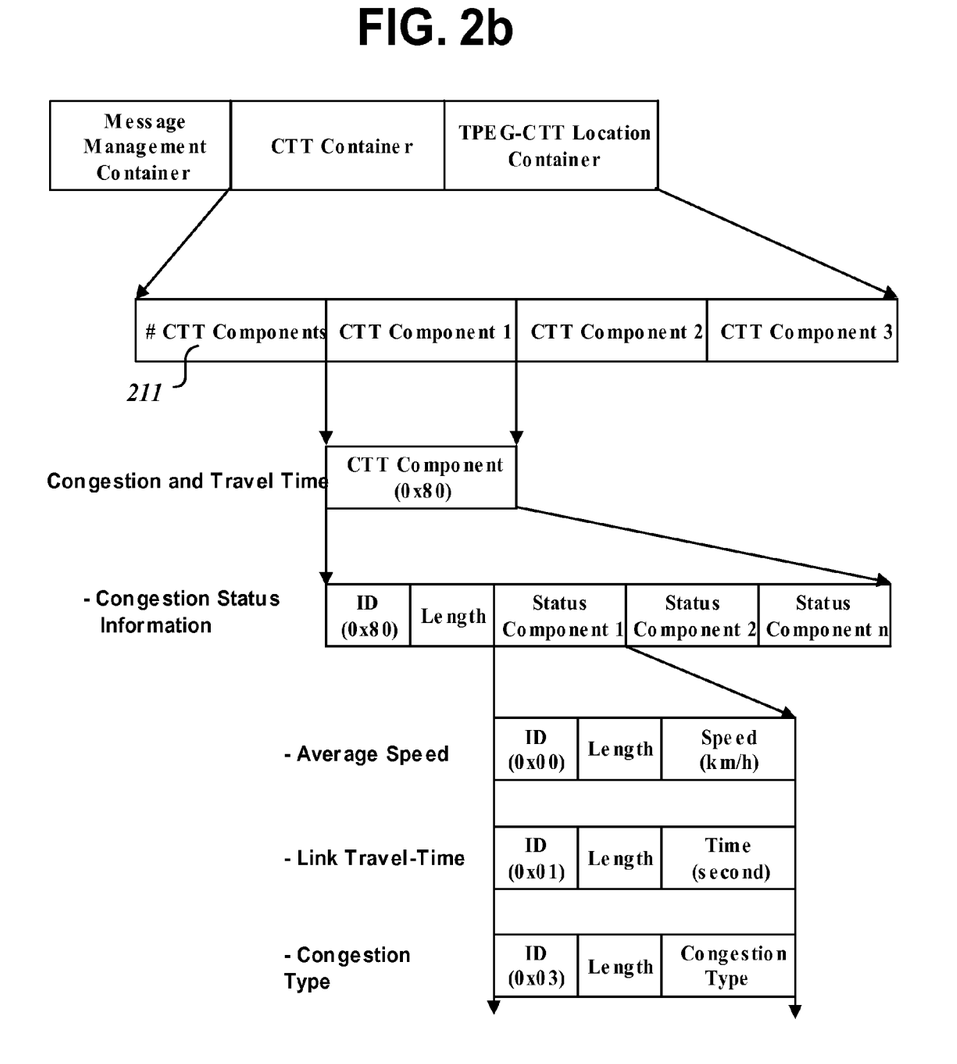
FIG. 2b illustrates a format of a TPEG-CTT message with an emphasis on status components delivering traffic information.
Figure 2C:
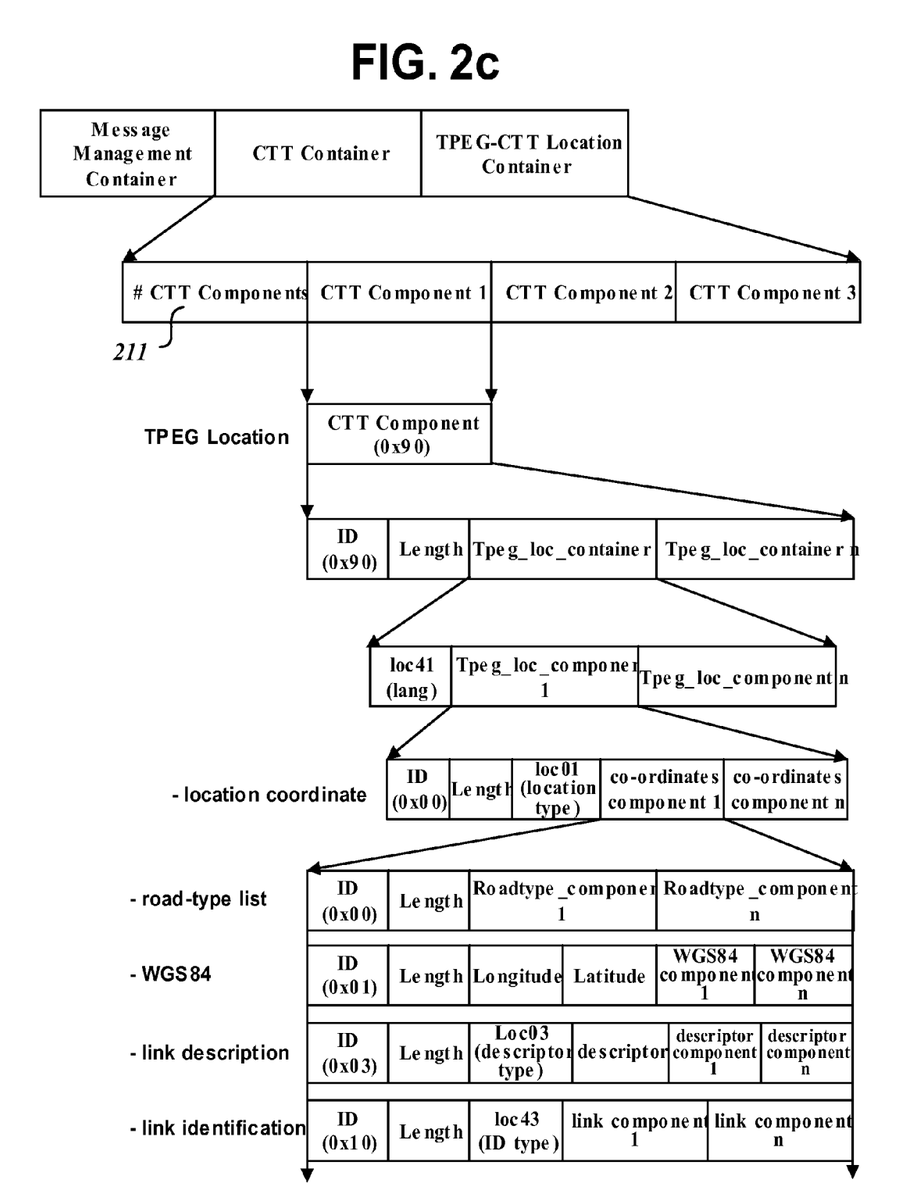
FIG. 2c illustrates a format of a TPEG-CTT message with an emphasis on coordinate components delivering link information.

As shown in FIGS. 2b and 2c, one message segment of the sequence 202, i.e., one TPEG-CTT message, may include a message management container including information on date and time, the message occurrence time, etc., a congestion and travel-time information (CTT) container, and a TPEG-CTT location container. The CTT container may include a field 211 indicative of the number of CTT components included in the CTT container and the TPEG-CTT location container. The field 211 may be followed by CTT components, the number of which is equal to the value stored in the field 211.

In various implementations, if a CTT component includes traffic congestion information, the CTT component is given an ID of 0x80, as shown in FIG. 2b, and includes one or more status components therein. Each status component may include an ID indicative of the information included therein. For example, a status component including an ID of 0x00 delivers the average speed in a link. A status component including an ID of 0x01 delivers link travel time. A status component including and ID of 0x03 delivers information on the degree or type of congestion. In the description, specific IDs are described as assignments to structures associated with specific information. The actual value of an assigned ID (e.g., 0x80) is exemplary, and different implementations may assign different values for specific associations or circumstances. Thus, the CTT component may be used to provide various different types of data that may be signaled based on an identifier. For example, FIG. 2B illustrates components with identifiers of 0x00 and 0x01 signaling, respectfully, speed and travel-time information.

Further, according to the various implementations if a CTT component includes link location information, the CTT component is given an ID of 0x90, as shown in FIG. 2c, and includes one or more TPEG-CTT location sub-containers. Each TPEG-CTT location sub-container 'Tpeg_loc$_{13}$ container' includes one or more TPEG-CTT location components, each of which includes one or more coordinate components having an ID of 0x00. Each coordinate component delivers information on a link or links for which the status component includes traffic information. A link may refer to a road segment which starts and ends at junctions and has no junction in between. A coordinate component including an ID of 0x00 includes information on the link type (e.g., expressway, national road, etc). A coordinate component including an ID of 0x01 includes coordinate information which may be expressed in the WGS84 format. A coordinate component including an ID of 0x03 includes link description information and a coordinate component including an ID of 0x10 includes link identification information.

The server 100 may construct the TPEG-CTT information as shown in FIGS. 2a through 2c from traffic information collected from various sources and may transmit the constructed TPEG-CTT information to traffic information receiving terminals wirelessly.

Information may be provided on a specific link in more detail. For example, if a driver wants to go to a location within a link which ends at an intersection and there is traffic congestion around the intersection, the average speed in the road segment is very low. If the driver estimates the approximate arrival time based on the average speed in the road, the actual arrival time may significantly deviate from the estimated arrival time, such as, for example, when the destination is near the congested intersection. As a result, the driver may benefit from detailed traffic information around the specific location.

In various implementation, the server 100 collects traffic information in a centralized manner, and creates and provides traffic information for a sub-link within a link. In one implementation, a sub-link is created if the difference between the average speed in the sub-link and the average speed in the other segment within the link exceeds a predetermined threshold level (e.g., 5 m/s or 10 m/s).

A process, according to various implementations, for providing traffic information on a virtual sub-link that does not correspond to a full actual link will now be described in detail.

Figure 3A:
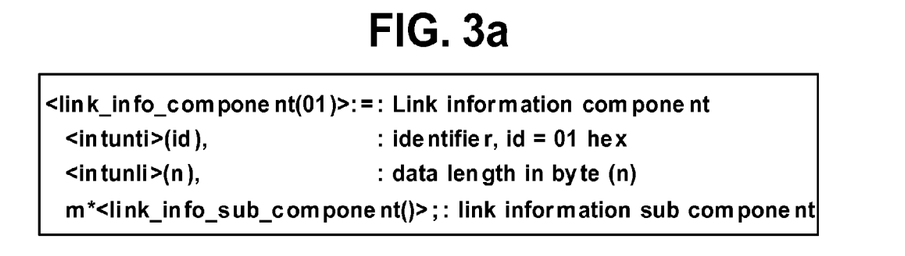
FIG. 3a illustrates a syntax of a link information component

To provide traffic information on a sub-link 10 within a link, the server 100 may construct a link information component, as shown in FIG. 3a, and may deliver the link information component via a TPEG-CTT location sub-container. The link information component is allocated an ID of 0x01 distinct from the ID of a coordinate component.

Figure 3B:
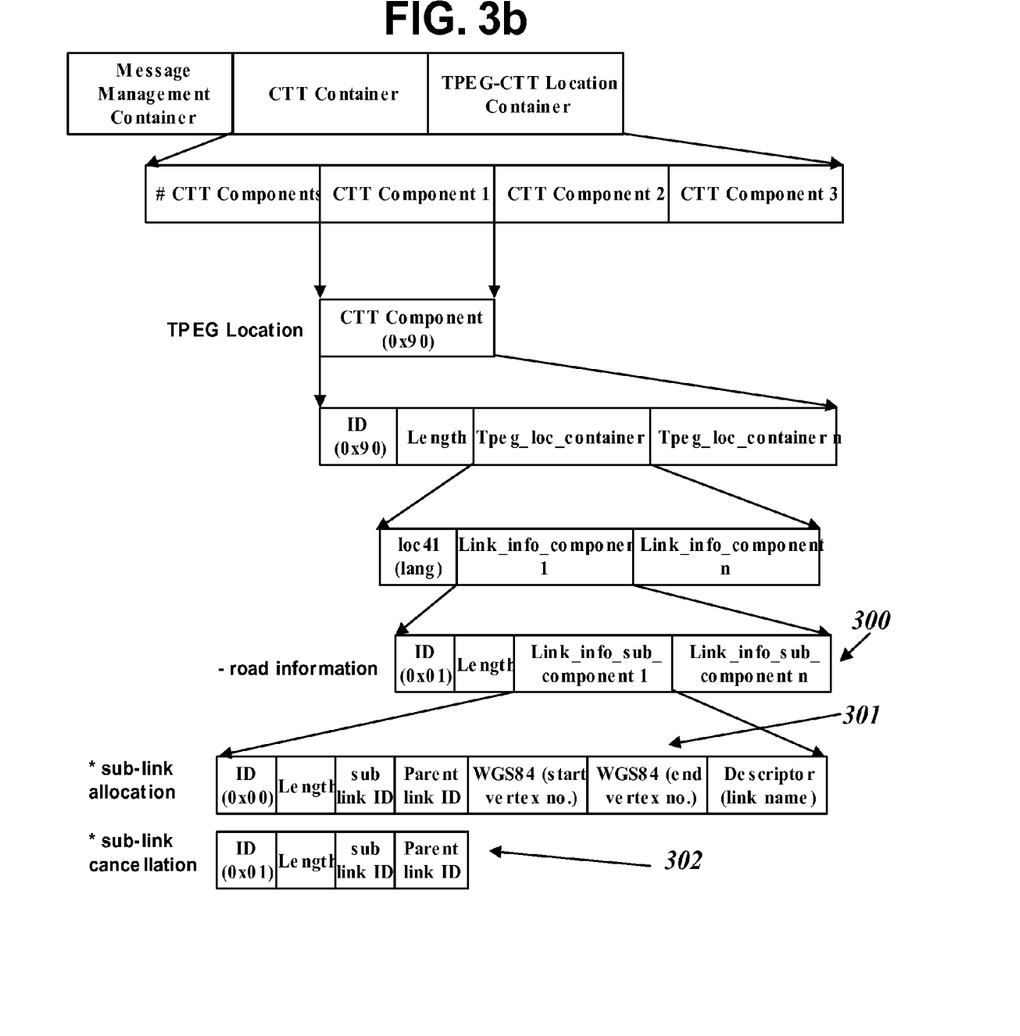
FIG. 3b illustrates a format of the TPEG-CTT message with an emphasis on link information components.

As shown in FIG. 3b, each link information component may include a link allocating sub-component 301 for allocating a sub-link as a virtual link within a link and a link canceling sub-component 302 for canceling an existing sub-link. A sub-link need not be an actual link but may be treated as a link in that congestion and traveling time information may be provided for each sub-link.

The link allocating sub-component 301 has an ID of 0x00 and may include a sub-link ID to allocate to a sub-link to be established, the ID of a parent link within which the sub-link is established, coordinate information indicative of the start and end positions of the sub-link, and/or a descriptor. In various implementations, the coordinate information may be a pair of 4-byte longitude and 4-byte latitude or indices of the vertices corresponding to the start and end positions of the sub-link formed within the parent link. The link canceling sub-component 302 has an ID of 0x01 and may include a sub-link ID, which is the ID of the sub-link to be canceled, and a parent link ID.

The server 100 may construct the TPEG-CTT information as shown in FIGS. 2a through 2c from traffic information collected from various sources and may transmit the constructed TPEG-CTT information to traffic information receiving terminals wirelessly. Under various circumstances, such as, for example, during the transmission, if the difference between the average speed in a local segment within a link and the average speed in the other segment of the link exceeds a threshold value, the server 100 may create a link allocating sub-component 301 for establishing the local segment as a sub-link and may deliver the link allocating sub-component 301 via the link information component 300.

Figure 3C:
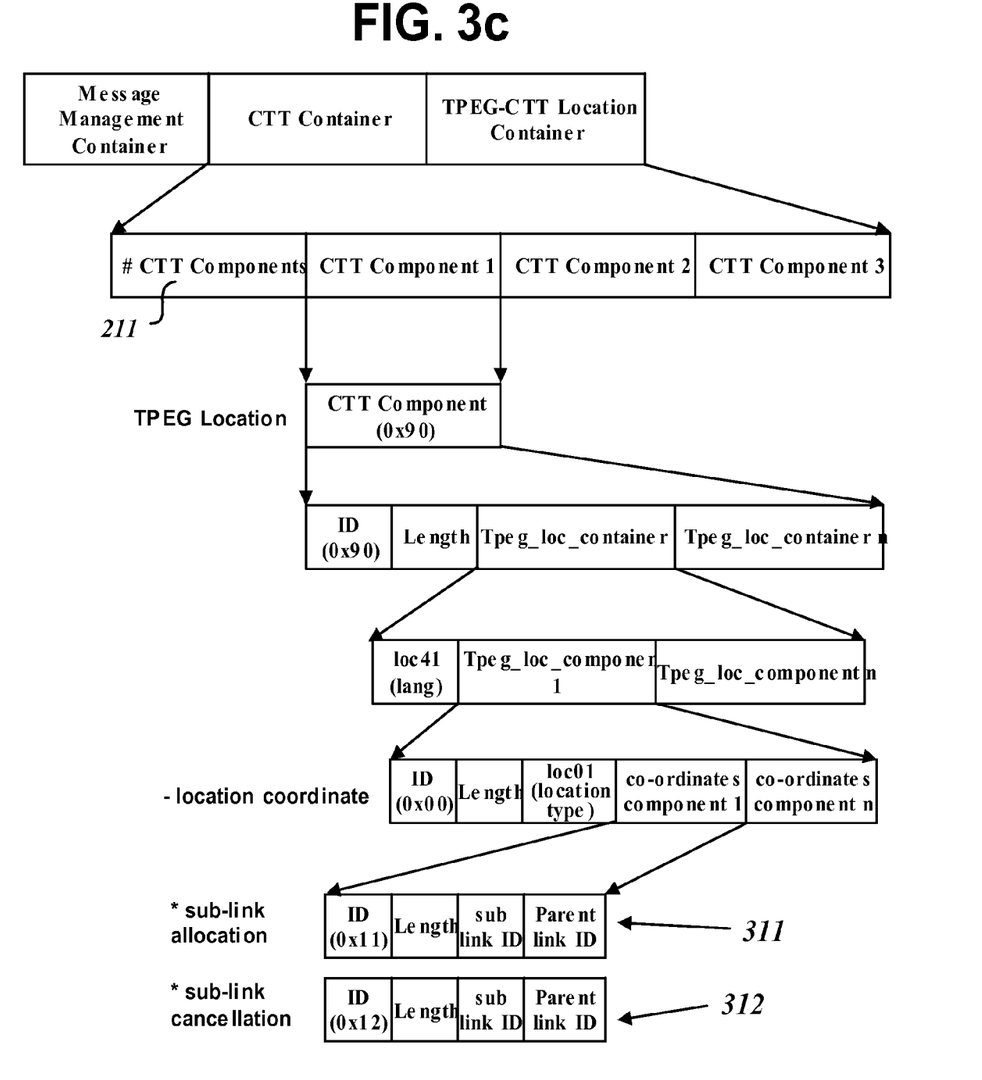
FIG. 3c illustrates a format to transmit information on a sub-link through coordinate components.

In another implementation, information on sub-link allocation and cancellation may be carried by a coordinate component including an ID of 0x00, as shown in FIG. 3c. In this case, IDs of, for example, 0x11 and 0x12 are allocated to a coordinate component carrying sub-link information to distinguish from other coordinate components carrying road-type list, WGS84, link description, and link identification.

In this implementation, location information that may be needed for allocating a sub-link, for example, WGS84 information on start and end points and sub-link description information, may be included dispersedly in both a WGS84 component and a description component shown in FIG. 2c.

The server 100 may transmit traffic information (e.g., average speed, link travel time, the degree of congestion, etc) for the sub-link in a similar manner to links.

According to various implementations, if the length of the sub-link which shows an average speed deviation larger than a threshold level changes, i.e., the change in the length of the sub-link exceeds a predetermined length (e.g., 20 m in the case of downtown roads), the server 100 may create and may transmit a link allocating sub-component (or sub-link allocating coordinate component) for reallocating a sub-link including the changed start and end positions. In this case, the server 100 may allocate the sub-component an ID, e.g., 0x02 (or 0x13) instead of 0x00 (or 0x11 indicative of a sub-link allocating coordinate component) to inform traffic information receiving terminals that a sub-link is established again within a parent link which already has a sub-link therein. A similar process may be used to shorten or move a sub-link, with the creating of a link shortening sub-component or a link moving sub-component.

After a sub-link is allocated in a link, the average speed in the link and the average speed in the sub-link may be provided separately.

In one implementation, if the difference between the average speed in a sub-link within a link and the average speed in the other segment of the link goes below the same or a different threshold value while the server 100 transmits traffic information for the sub-link, the server 100 may create a link canceling sub-component 302 for canceling the allocated sub-link as shown in FIG. 3b and may deliver the link canceling sub-component 302 via the link information component 300.

Figure 4:
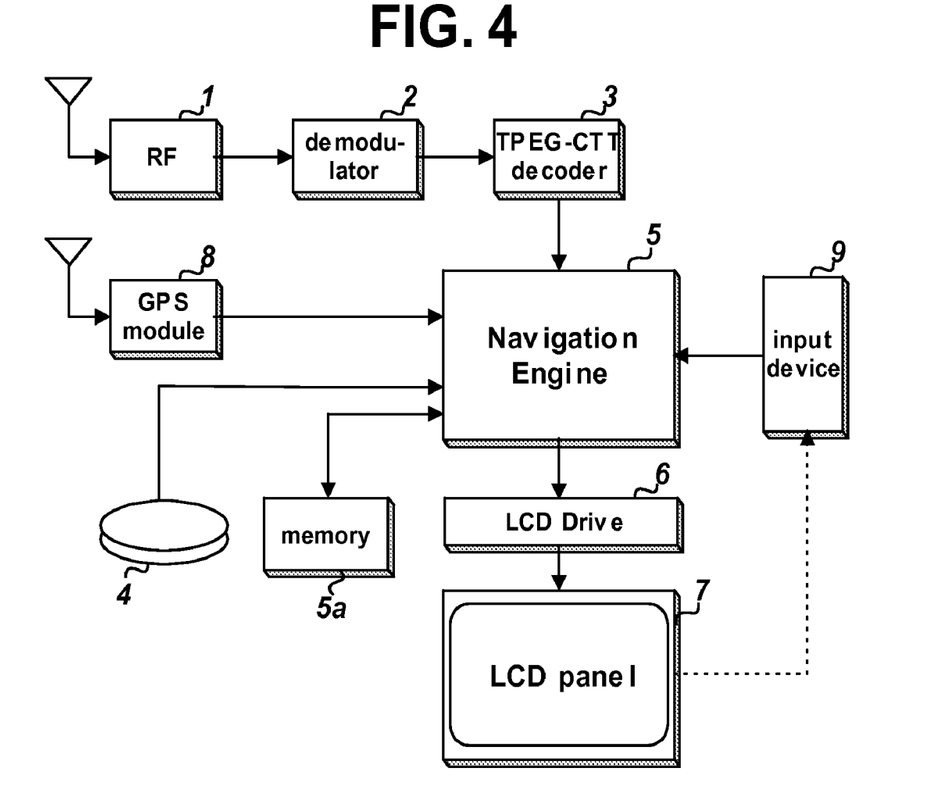
FIG. 4 illustrates a block diagram of a navigation terminal that receives traffic information transmitted from a server.

FIGS. 4-6 are example implementations of systems for receiving and utilizing traffic information. Other systems may be organized differently or include different components. Specifically, FIG. 4 is an example of a block diagram of a navigation terminal that receives traffic information transmitted from the server 100.

The navigation terminal includes a tuner 1 for receiving modulated traffic information signals by resonating at the required frequency band, a demodulator 2 for outputting traffic information signals by demodulating the modulated signals from the tuner 1, a TPEG-CTT decoder 3 for extracting traffic information by decoding the demodulated traffic information signals, a GPS module 8 for calculating the current position (i.e., latitude, longitude, and altitude) by receiving signals from a plurality of satellites, storage structure 4 for storing various graphic data and an electronic map including information on links and nodes, an input unit 9 for receiving user input, a navigation engine 5 for controlling screen display based on the user input, the current position, and extracted traffic information, a memory 5a for storing data temporarily, an LCD panel 7 for displaying data, and an LCD drive 6 for driving the LCD panel 7 according to data to be presented. The input unit 9 may be a touch screen incorporated into the LCD panel 7.

The tuner 1 tunes to the frequency of the signals transmitted by the server 100 and the demodulator 2 demodulates the tuned signals in a predetermined manner. The TPEG-CTT decoder 3 extracts TPEG-CTT messages, as shown in FIGS. 2a through 2c and FIG. 3a and 3b (or 3c), and stores the TPEG-CTT messages temporarily. Interpreting the temporarily stored TPEG-CTT messages, the TPEG-CTT decoder 3 sends the extracted information and/or control data to the navigation engine 5. Though various kinds of information is provided for the navigation engine 5 by the TPEG-CTT decoder 3, for purposes of brevity, the following description will focuses on the method for allocating sub-links and the method for processing traffic information for sub-links.

The TPEG-CTT decoder 3 extracts data/time and message occurrence time included in the message management container of each TPEG-CTT message and determines if the following container is a CTT event container based on 'message element' information (i.e. an identifier). If it is determined that the following container is a CTT event container, the TPEG-CTT decoder 3 provides the navigation engine 5 with the information obtained from the CTT component included in the CTT event container so that the navigation engine 5 can display congestion and travel-time information and link information, which will be described below. Providing the navigation engine 5 with the information may include determining, based on identifiers, that the traffic information includes a message management container including status or sub-link information within various message components within the message management container. The components may each include different status or sub-link information associated with different links, composite links, or locations and identifiers associated with the different status or sub-link information. The containers and components may each include information associated with a generation time, version number, data length, and identifiers of included information.

The TPEG-CTT decoder 3 then extracts information on the link location about which the previously extracted information may be created from the following TPEG-CTT location container. The position information may be, for example, the coordinates (i.e., latitudes and longitudes) of the start and end positions or a link ID, depending on the type of the TPEG-CTT location container. If the navigation terminal is equipped with the storage structure 4, the navigation engine 5 finds the link location about which the received information is created with reference to information on each link and node stored in the storage structure 4. The navigation engine 5 may convert the coordinates of the link into the link ID or vice versa.

In the implementation of FIG. 3b, the TPEG-CTT decoder 3 may determine if a link information component including an ID of 0x01 is delivered via a TPEG-CTT location sub-container and if so, may extract each sub-component from the link information component. If the extracted sub-component is a link allocating sub-component (e.g., includes an appropriate identifier), such as including an ID of 0x00 for allocating a sub-link, the TPEG-CTT decoder 3 may extract the ID of the sub-link to allocate, the ID of the parent link, information on the start and end positions, and descriptor and provides the extracted information for the navigation engine 5 so that the extracted information may be stored as a temporary link entry in the memory 5a. If the extracted sub-component is a link canceling sub-component (e.g., includes an appropriate identifier), such as including an ID of 0x01 for canceling an existing sub-link, the TPEG-CTT decoder 3 may make a request for removing a temporary link entry including an ID that is the same as the sub-link ID of the sub-component so that the navigation engine 5 can remove the sub-link entry from the memory 5a.

In the implementation of FIG. 3c, a sub-link allocating coordinate component or a sub-link cancellation coordinate component may be extracted from a TPEG-CTT location component including ID of 0x00 included in a TPEG-CTT location sub container, and the above-explained operations may be conducted according to information included in the extracted component.

The navigation engine 5 reads a part of the electronic map centered around the position coordinates received from the GPS module 8 from the storage structure 4 and displays the map on the LCD panel 7 via the LCD drive 6. A particular graphic symbol is displayed at the location corresponding to the current position on the LCD panel 7.

The navigation engine 5 may display the average speed or average travel time in a link received from the TPEG-CTT decoder 3 at a location corresponding to the coordinates or link ID delivered via the TPEG-CTT location container following the container delivering the average speed or average travel time information. In this case, the navigation engine 5 may search the storage structure 4 for the link corresponding to the coordinates or link ID received from the TPEG-CTT location container. If the link is not found, then the navigation engine 5 may determine if there is a matched temporary link entry in the memory 5a. In this search operation, temporarily allocated sub-links as well as actual links may be searched. The traffic information for the link and/or sub-link specified by the search operation may be extracted from the corresponding status component included in a CTT component including an ID of 0x80.

Figure 5:
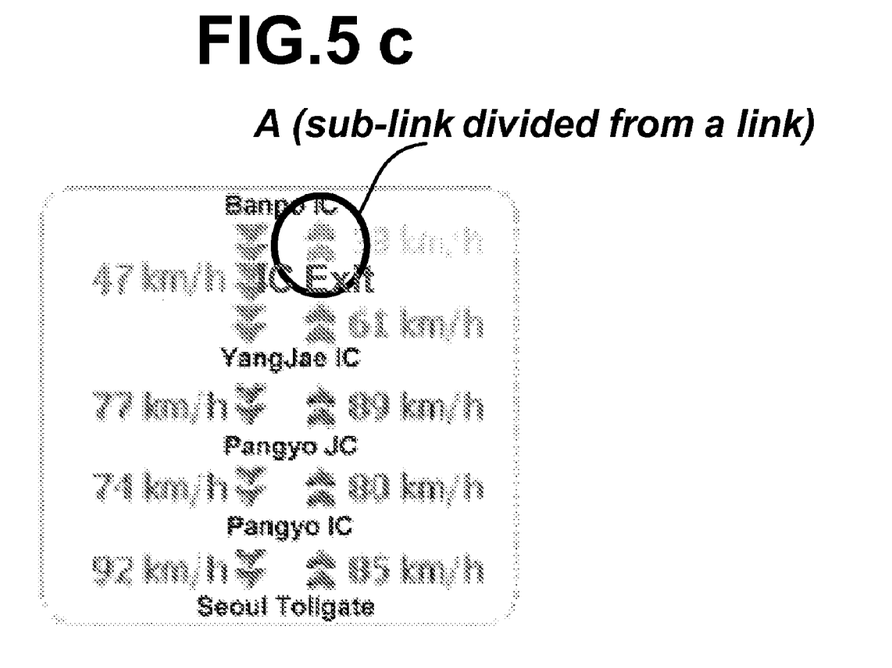
FIGS. 5a through 5c illustrate examples of displaying traffic information such as average speed in a link, and a sub-link.
Figure 5A:
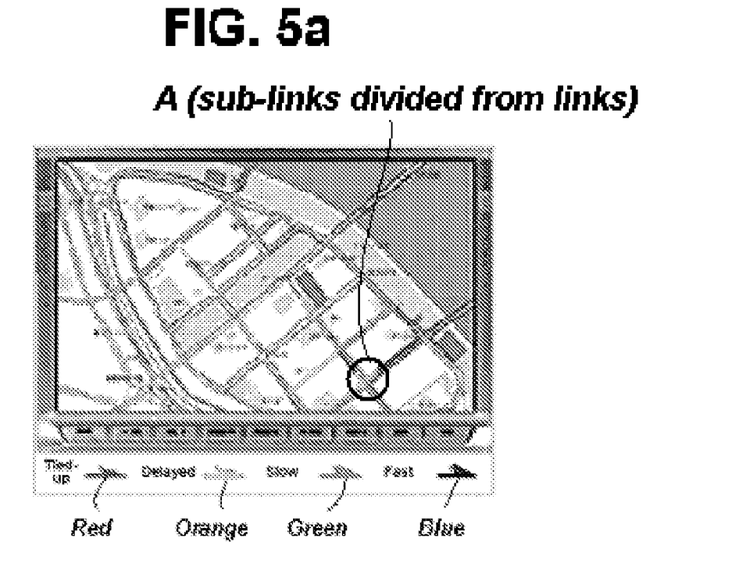
Figure 5B:
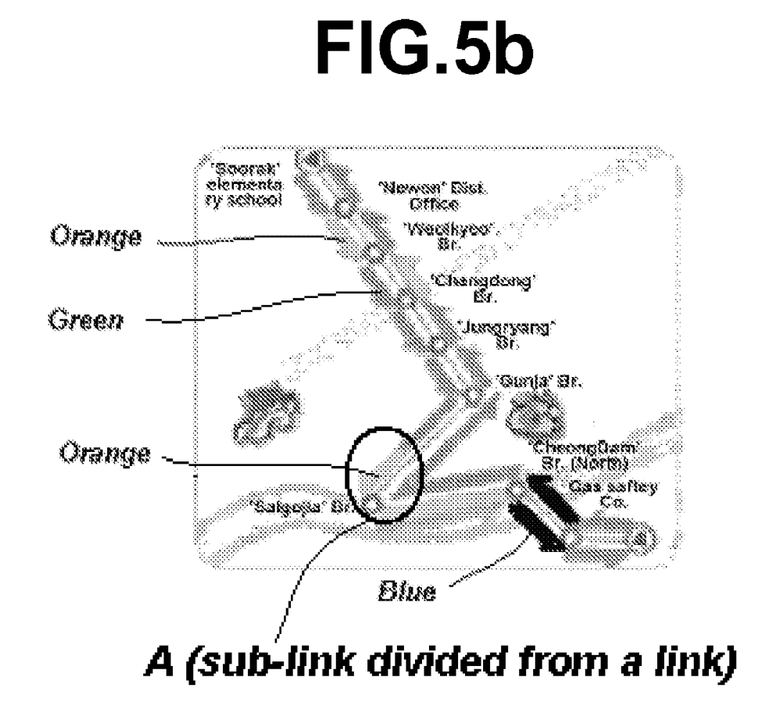

There are various alternative methods for the navigation engine 5 to display traffic information. For example, the navigation engine 5 may show links in different colors according to the average speed in the links, as shown in FIGS. 5a and 5b, or may show the average speed with number in each link as shown in FIG. 5c. In FIGS. 5a and 5b, the red, orange, green, blue colors indicate average speeds of 0-10 km, 1020 km, 2040 km, over 40 km, respectively.

If the navigation terminal is not equipped with the storage structure 4 for storing an electronic map, the terminal may show the average speed or the travel time in links located in front of the current position with different colors as shown in FIG. 5b, or with figures as shown in FIG. 5c. If the route of the car with the navigation terminal installed is determined, the navigation terminal may show the average speed in the links included in the determined route instead of the links located in front of the current position.

If the traffic information for a temporary link entry stored in the memory 5a, i.e., a sub-link, is received, the navigation engine 5 may display the traffic information for the sub-link with colors or figures, as marked 'A' in FIGS. 5a through 5c to be distinguished from the traffic information for the parent link.

If the terminal in FIG. 4 is equipped with a voice output device, the terminal may output received traffic information for a specified link or sub-links included in a specified route in voice. If the specified link or one of the links included in the specified route is a sub-link, a voice message describing the average speed in the sub-link is generated. If the descriptor in the link allocating sub-component (or link description component) shown in FIG. 3b is "xxx", the voice message may be "the average speed in xxx segment is nn".

The present disclosure enables estimation of an approximate arrival time even when the roads around the destination are congested locally by providing additional traffic information for a road segment showing a big deviation in the average speed from the other segment of the road.

In the previous discussion, wherever average speed has been referenced, it may be interpreted as either of actual or predicted average speed, or it may be replaced or supplemented with other status or component based information, such as, for example, actual or predicted travel time (e.g., to traverse the link), congestion tendency, and/or congestion amount.

The foregoing description has been presented for purposes of illustration. Thus, various implementations with improvements, modifications, substitutions, or additions within the spirit and scope as defined by the following appended claims.

What is claimed is:

1. An apparatus for processing traffic information, the apparatus comprising:
    a receiving unit configured to receive traffic information including a traffic information message, wherein the traffic information message in a Transport Protocol Experts Group Congestion and Travel-Time (TPEG-CTT) format includes:
        location information corresponding to a road, wherein the road includes a first part and a second part, and
        speed information for the first part of the road and the second part of the road, wherein the speed corresponding to the first part of the road is the same as the speed for the second part of the road at a first time, wherein the speed corresponding to the first part of the road is different from the speed corresponding to the second part of the road at a second time, and wherein the second time is later than the first time; and
    a decoding unit configured to decode the traffic information.

2. The apparatus of claim 1, wherein the traffic information further includes a first identifier to identify that the traffic information includes the speed information.

3. The apparatus of claim 1, wherein location information includes, for each of the first part and the second part of the road, information corresponding to a start location and an end location within the road.

4. The apparatus of claim 3, wherein the start location of the first part is different from the start location of the second part, and the end location of the first part is different from the end location of the second part.

5. An apparatus for processing traffic information, the apparatus comprising:
    a receiving unit configured to receive the traffic information including a first traffic message in a Transport Protocol Experts Group Congestion and Travel-Time (TPEG-CTT) format and a second traffic information message in a TPEG-CTT format,
    wherein the first traffic information message includes:
        location information corresponding to a road, and speed information for the road at a first time, and
    wherein the second traffic information message includes:
        location information corresponding to the road, wherein said road includes a first part and a second part, and
        speed information for the first part of the road and the second part of the road at a second time, wherein the speed corresponding to the first part of the road is different from the speed corresponding to the second part of the road, and wherein the second time is later than the first time; and
    a decoding unit configured to decode the received traffic information.

* * * * *

UNITED STATES PATENT AND TRADEMARK OFFICE
CERTIFICATE OF CORRECTION

| | | |
|---|---|---|
| PATENT NO. | : 8,050,853 B2 | Page 1 of 1 |
| APPLICATION NO. | : 11/419187 | |
| DATED | : November 1, 2011 | |
| INVENTOR(S) | : Mun Ho Jung et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,058 days.

Signed and Sealed this
Twentieth Day of March, 2012

David J. Kappos
*Director of the United States Patent and Trademark Office*